United States Patent [19]

Ohnishi et al.

[11] 4,411,131
[45] Oct. 25, 1983

[54] CHAIN LINK PLATE

[75] Inventors: Tatsuo Ohnishi; Takeshi Uemura; Teruo Nakajima, all of Osaka, Japan

[73] Assignee: Tsubakimoto Chain Co., Osaka, Japan

[21] Appl. No.: 222,238

[22] Filed: Jan. 5, 1981

[30] Foreign Application Priority Data

Mar. 25, 1980 [JP] Japan .................. 55-036911

[51] Int. Cl.³ .................................. F16G 15/14
[52] U.S. Cl. .............................. 59/78; 59/84; 474/228
[58] Field of Search .................. 59/6, 8, 13, 14, 15, 59/35, 78, 90, 91, 85, 84; 474/228, 229, 230, 231; 83/32, 56

[56] References Cited

U.S. PATENT DOCUMENTS

| | | | |
|---|---|---|---|
| 559,807 | 5/1896 | Moore | 474/229 |
| 576,115 | 2/1897 | Hauger | 474/228 |
| 663,353 | 12/1900 | Morse | 474/229 |
| 1,127,072 | 2/1915 | Morse | 59/35 |
| 1,273,001 | 7/1918 | Rockenfield | 474/229 |
| 1,846,635 | 2/1932 | Finley | 83/32 |
| 2,277,915 | 3/1942 | Klaucke | 474/230 |
| 3,398,614 | 8/1968 | Cleary | 83/32 |
| 3,492,885 | 2/1970 | Nolte | 474/230 |
| 4,328,665 | 5/1982 | Taubert | 59/88 |

*Primary Examiner*—Gene Crosby
*Attorney, Agent, or Firm*—Flynn, Thiel, Boutell & Tanis

[57] ABSTRACT

A chain link plate including a pair of enlarged end parts joined by an intermediate constricted part. Each end part has an opening therethrough. The link plate is symmetrical about a first axis which extends longitudinally of the link plate and passes through the centers of the openings. The link plate is also symmetrical about a second axis which extends perpendicular to the first axis and perpendicular to the axes of the openings. Each end part has a convex curved exterior edge surface generated about a first radius which is centered on the first axis. The intermediate constricted part has upper and lower concave curved exterior edge surfaces each defined about a second radius which is generated about a center point located in sidewardly spaced relationship from the link plate. The second radius is equal to the first radius. The concave curved exterior edge surface of the constricted part merges with the convex curved exterior edge surface of the adjacent end part along a common line which is tangential to both curved exterior edge surfaces.

4 Claims, 6 Drawing Figures

CHAIN LINK PLATE

FIELD OF THE INVENTION

This invention relates to the shape of a chain link plate blanked from sheet material.

BACKGROUND OF THE INVENTION

With conventional chain link plates, the radius of curvature of the constricted part in the middle of the top and bottom sides thereof has been larger than that of the expanded part at the front and rear ends thereof. Also, the longitudinal length of the constricted part has been either longer or shorter than that of the expanded part. Namely, there have been no chain link plates in which the contour of the constriceed and expanded parts is formed by an inter-compensatingly contacting curve.

It has been unable to bring the contours of adjacent blanks into contact so as to compensate for each other because of the necessity of leaving a lattice-like space comprising carriers and bridges, which is indispensable for the blanking operation, between one chain link plate blank and another.

Having invented a method of blanking which eliminates the need for carriers and bridges, as disclosed in copending application Ser. No. 222,232, now U.S. Pat. No. 4,362,078, filed concurrently herewith, the inventors have developed a blank wherein part of the contour line of a blank is formed with a compensating line which brings the blank into close contact with another blank, thereby greatly decreasing the blank leftover and remarkably improving the material-to-blanked product yield.

Now some embodiments of this invention will be described by reference to the accompanying drawings.

DETAILED DESCRIPTION

Figure 1:
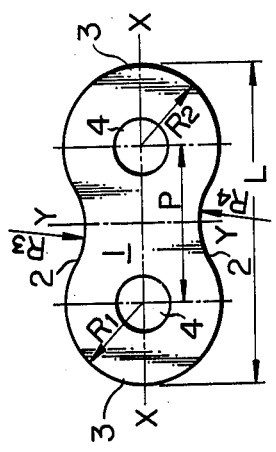
FIG. 1 is a plan view of a link plate.

FIG. 1 shows a gourd-shaped chain link plate (hereinafter called a link plate) 1 which has a constricted part 2 in the middle of the top and bottom sides thereof and a circularly expanded part 3 at the front and rear ends thereof. The contour of the link plate 1 is formed of a closed curve which is vertically and horizontally symmetrical with respect to a central horizontal reference line X—X and a central vertical reference line Y—Y respectively. An opening 4 to pass a link plate connecting pin or a bush is perforated in the expanded part 3, concentrically with respect to the circular portion thereof.

The radii of curvature $R_1$ and $R_2$ of the circular portion of the expanded part 3, and $R_3$ and $R_4$ of the constricted part 2 have the following relationship:

$$R = R_1 = R_2 = R_3 = R_4$$

The pitch P between the openings 4 through which the connecting pin or bush is passed can be expressed as follows:

$$P = 2R$$

The overall length L between the front and rear ends of the link plate 1 can be expressed as $$L = 4R$$

Figure 2:
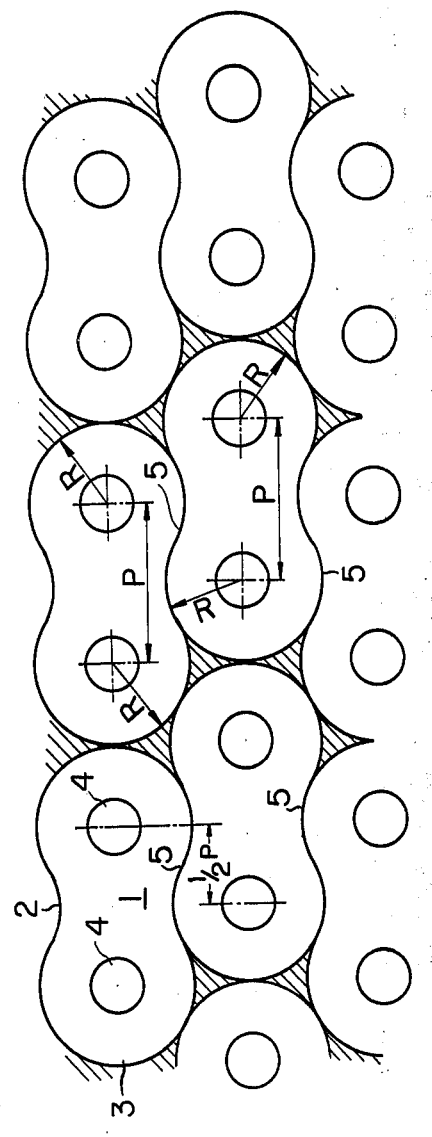
FIG. 2 is a plan view showing the principal part of a blank layout of the link plate of FIG. 1.

FIG. 2 shows a link plate 1 having the above-described contour which is drawn on a material sheet in contact with other link plates of the same shape, one each at the front and rear end thereof, and one each at the top and bottom thereof so that the center of one of the two connecting pin or bush inserting openings 4 thereof lie at a point midway of the pitch P of the intermediate link plate. From the above equations defining the relationships of R, P and L, the contour of the constricted part 2 and the expanded part 3 of adjacent link plates compensatingly contact with each other along a common tangential line 5, leaving no space therebetween. When this link plate is blanked according to the aforementioned method of blanking after lancing along the continuous tangential line 5, only the hatched parts shown in FIG. 2 are left behind, entailing a marked improvement in the yield of blanked products over the conventional methods.

Figure 3:
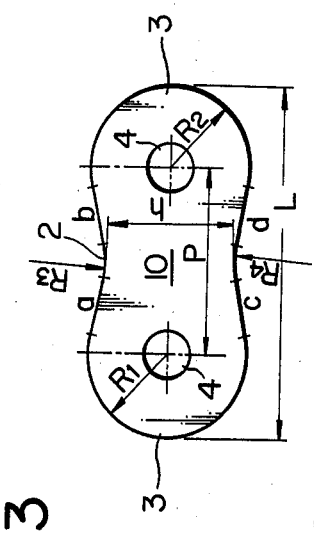
FIG. 3 is a plan view showing another embodiment of link plate.

FIG. 3 shows another link plate 10 in which the pitch P between the connecting pin or bush inserting openings 4 and the overall length L has the following relationships:

$$P > 2R$$

(where $R = R_1 = R_2 = R_3 = R_4$)

$$L = P + 2R$$

Figure 4:
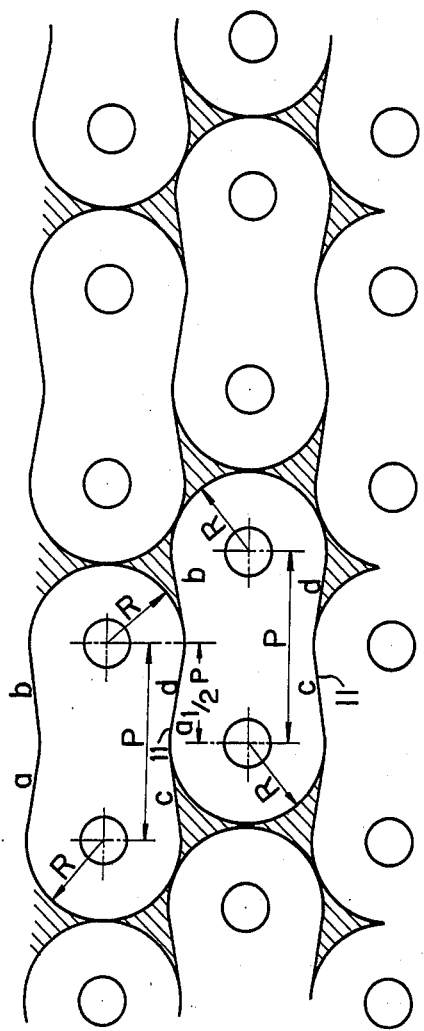
FIG. 4 is a plan view showing the principal part of a blank layout of the link plate of FIG. 3.

The curves forming the constricted part 2 and the expanded part 3 are joined together by straight lines a, b, c and d, which straight lines are all of equal length and are tangential to the two joined curves at the points of contact. A link plate 10 having the above-described contour is drawn on a material sheet as shown in FIG. 4. The center of one of the two connecting pin or bush inserting openings 4 of one link plate is disposed at a point corresponding to the point midway of the pitch P. Then the overlying and underlying link plates come in contact with each other along a common continuous tangential line 11, leaving no space therebetween. After blanking, only very small parts, indicated by hatching, remain unused, as in the case of FIGS. 1 and 2.

Figure 5:
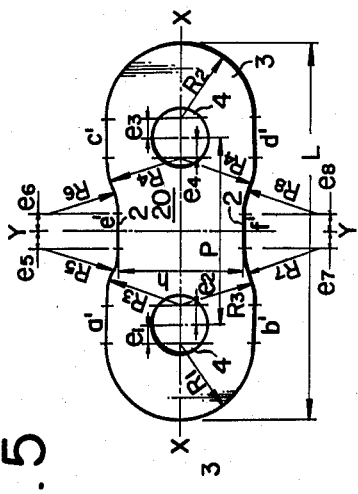
FIG. 5 is a plan view of still another embodiment of link plate.

A link plate 20 shown in FIG. 5 is a modification of the embodiment in FIG. 1, and is slightly elongated longitudinally. The constricted part 2 is defined by central straight lines e' and f' and continuous inwardly curved lines having the radii of curvature $R_5$, $R_6$, $R_7$ and $R_8$ centered on points longitudinally spaced from the vertical reference line Y—Y by distances $e_5$, $e_6$, $e_7$ and $e_8$, respectively. The centers of the radii of curvature $R_1$ and $R_2$ of the expanded parts 3 are located at points which are longitudinally spaced outwardly from the centers of the connecting pin inserting openings 4 by distances $e_1$ and $e_3$. The circular curves (180° curves)

of the expanded parts 3 and the continuous contour lines of the constricted part 2 are joined together by straight lines a', b', c' and d' and continuous outwardly curved lines having the radii of curvature $R_3$ and $R_4$ centered on points longitudinally spaced inwardly from the centers of the connecting pin inserting openings by distances $e_2$ and $e_4$. The contour of this link plate satisfies the following equations:

$$P > 2R$$

$$L = P + 2R + 2e$$

(where $R = R_1 = R_2 = R_3 = R_4 = R_5 = R_6 = R_7 = R_8$ $e = e_1 = e_2 = e_3 = e_4 = e_5 = e_6 = e_7 = e_8$)

Figure 6:
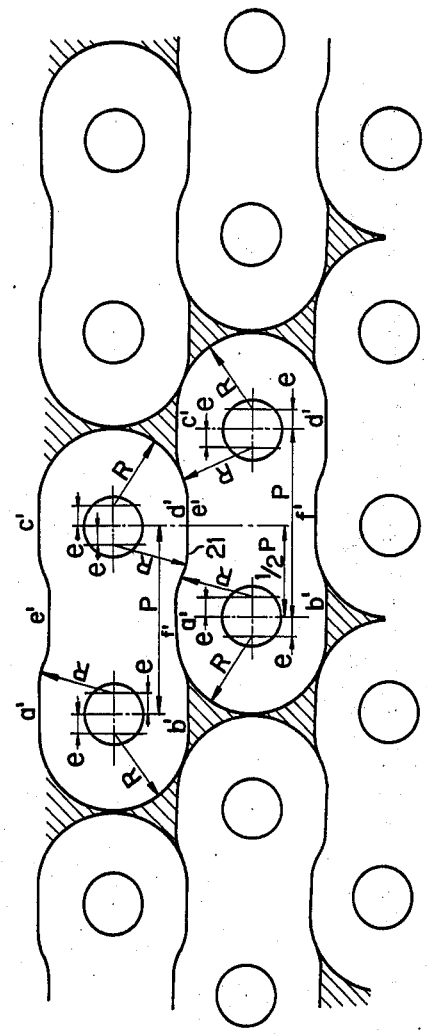
FIG. 6 is a plan view showing the principal part of a blank layout of the link plate of FIG. 5.

As shown in FIG. 6, this link plate can be arranged so that the center of the connecting pin or bush inserting opening thereof lies at a point corresponding to a point midway of the pitch P of the overlying and underlying link plates of the same shape. Then the intermediate link plate comes in contact with the overlying and underlying link plates along a common continuous tangential line 21, leaving no space therebetween.

This link plate also reduces the blank leftover greatly, as with the embodiments in FIGS. 1 and 3.

As described above, the link plate according to this invention has a contour defined by a continuous tangential line which permits bringing one link plate into compensatingly close contact with another, sharing a common contour line so as to leave no space therebetween. This greatly improves the yield of blanked link plates, and produces much less blank leftover. All this leads to great cost reduction and productivity improvement.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A link plate for a link-type chain, said link plate including a pair of enlarged end parts joined together by an intermediate constricted part, each end part having an opening extending therethrough, said link plate being symmetrical about a first axis which extends longitudinally of the link plate and passes through the centers of the openings, the link plate also being symmetrical about a second axis which extends perpendicular to the first axis and perpendicular to the axes of said openings and passes through a point on said first axis which is the midpoint between the axes of said openings, the improvement wherein each end part has a convex curved exterior edge surface generated about a first radius which is centered on the first axis, wherein the intermediate constricted part has upper and lower concave curved exterior edge surfaces each defined about a second radius which is generated about a center point located in sidewardly spaced relationship from the link plate, the second radius being equal to the first radius, the concave curved exterior edge surface of the intermediate constricted part being merged with the convex curved exterior edge surface of the adjacent end part along a common line which is tangential to both curved exterior edge surfaces, wherein the longitudinal distance between the centers of said openings is equal to twice said first radius, wherein said convex exterior edge surface as associated with each end part includes opposite side edge surface portions which are of selected lengths and are intersected by a third axis which is parallel to said second axis but extends through the center point of said first radius as associated with the respective end part, and wherein said concave exterior edge surface as it extends from one end to the other end thereof defines a contour which is identical to the contour of said side edge surface portion of said convex exterior edge surface so that the concave exterior edge surface on a first said link plate in its entirety compensatingly contacts the side edge surface portion of a second said link plate when said first and second link plates are positioned in side-by-side but longitudinally offset relationship to one another.

2. A link plate according to claim 1, wherein the first radius is centered about the center point of the respective said opening, wherein the center point for the second radius is located on said second axis at a location wherein the center point does not intersect or lie on the link plate, and wherein each end of the concave curved exterior edge surface merges and joins directly to the adjacent end of the convex curved exterior edge surface along the common tangential line.

3. A link plate for a link-type chain, said link plate including a pair of enlarged end parts joined together by an intermediate constricted part, each end part having an opening extending therethrough, said link plate being symmetrical about a first axis which extends longitudinally of the link plate and passes through the centers of the openings, the link plate also being symmetrical about a second axis which extends perpendicular to the first axis and perpendicular to the axes of said openings and passes through a point on said first axis which is the midpoint between the axes of said openings, the improvement wherein each end part has a convex curved exterior edge surface generated about a first radius which is centered on the first axis, wherein the intermediate constricted part has upper and lower concave curved exterior edge surfaces each defined about a second radius which is generated about a center point located in sidewardly spaced relationship from the link plate, the second radius being equal to the first radius, the concave curved exterior edge surface of the intermediate constricted part being merged with the convex curved exterior edge surface of the adjacent end part along a common line which is tangential to both curved exterior edge surfaces, and wherein four identical straight edge surface sections are formed on the edge of the link plate, each said straight edge surface section extending between one end of said concave curved exterior edge surface and the adjacent end of said convex curved exterior edge surface, said straight edge surface section extending along said common tangential line.

4. A link plate for a link-type chain, said link plate including a pair of enlarged end parts joined together by an intermediate constricted part, each end part having an opening extending therethrough, said link plate being symmetrical about a first axis which extends longitudinally of the link plate and passes through the centers of the openings, the link plate also being symmetrical about a second axis which extends perpendicular to the first axis and perpendicular to the axes of said openings and passes through a point on said first axis which is the midpoint between the axes of said openings, the improvement wherein each end part has a convex curved exterior edge surface generated about a first radius which is centered on the first axis, wherein the intermediate constricted part has upper and lower concave curved exterior edge surfaces each defined about a second radius which is generated about a center point located in sidewardly spaced relationship from the link plate, the second radius being equal to the first radius, the concave curved exterior edge surface of the intermediate constricted part being merged with the convex curved exterior edge surface of the adjacent end part along a common line which is tangential to both curved exterior edge surfaces, wherein the convex curved exterior edge surface associated with each end part is interrupted by a pair of identical straight edge surface sections which are parallel with said first axis and are located on substantially diametrically opposite sides of the respective end part, said straight edge surface sections being tangential to and continuously joined with the convex curved exterior edge surface, and wherein the concave curved exterior edge surface defined on the upper and lower side edges of the intermediate constricted part also has a straight edge surface portion associated therewith, the straight edge surface portions associated with the opposed concave curved exterior edge surfaces being identical and directly opposite and in parallel relationship with one another and parallel with said first axis, the straight edge portions being identical to the straight edge sections, the straight edge surface portion being positioned centrally of the concave curved exterior edge surface so that the latter is divided into two spaced-apart arcuate segments, said last-mentioned straight edge surface portion being perpendicular to and extending through equal distances on opposite sides of said second axis.

* * * * *